US006774952B1

(12) United States Patent
Ratcliffe

(10) Patent No.: US 6,774,952 B1
(45) Date of Patent: Aug. 10, 2004

(54) BANDWIDTH MANAGEMENT

(75) Inventor: Martin John Ratcliffe, Bracknell (GB)

(73) Assignee: LSI Logic Corporation, Milpitas, CA (US)

( * ) Notice: Subject to any disclaimer, the term of this patent is extended or adjusted under 35 U.S.C. 154(b) by 475 days.

(21) Appl. No.: 09/838,784

(22) Filed: Apr. 19, 2001

(51) Int. Cl.[7] .............................. H04N 7/26; H04N 7/01
(52) U.S. Cl. ..................... 348/581; 348/458; 348/704; 348/715; 382/298; 375/240; 345/660
(58) Field of Search ........................ 348/581, 568, 348/567, 458, 445, 704, 715, 714, 387.1, 390.1, 440.1; 382/298, 299; 345/660, 667, 670, 671; 375/240, 240.21

(56) References Cited

U.S. PATENT DOCUMENTS

| | | | | |
|---|---|---|---|---|
| 5,526,051 A | * | 6/1996 | Gove et al. ............. | 375/240.01 |
| 5,796,442 A | * | 8/1998 | Gove et al. ............. | 348/556 |
| 6,014,125 A | * | 1/2000 | Herbert ................. | 345/660 |
| 6,064,437 A | * | 5/2000 | Phan et al. ............. | 348/446 |
| 6,339,434 B1 | * | 1/2002 | West et al. ............. | 345/667 |
| 6,442,206 B1 | * | 8/2002 | Hrusecky ............. | 375/240.21 |
| 6,529,935 B1 | * | 3/2003 | MacInnis et al. ........ | 709/102 |

* cited by examiner

*Primary Examiner*—Michael H. Lee
*Assistant Examiner*—Jean W. Désir
(74) *Attorney, Agent, or Firm*—Christopher P. Maiorana PC

(57) ABSTRACT

The invention relates to a method and apparatus for vertically scaling a video picture comprising receiving and storing lines of a video frame of a video picture, reading lines of the frame into linestores, applying the lines to a vertical filter and providing an output video line as a function of the lines. Reading the lines of the frame into linestores comprises reading M lines of each successive $2^{nd}$ line of the frame lines into the linestores. Following generation of the output video line, a further X lines are read from the framestore into the linestores to provide a further set of M lines in the linestores. The M lines are applied to the vertical filter to provide a further output video line as a function of the lines.

17 Claims, 7 Drawing Sheets

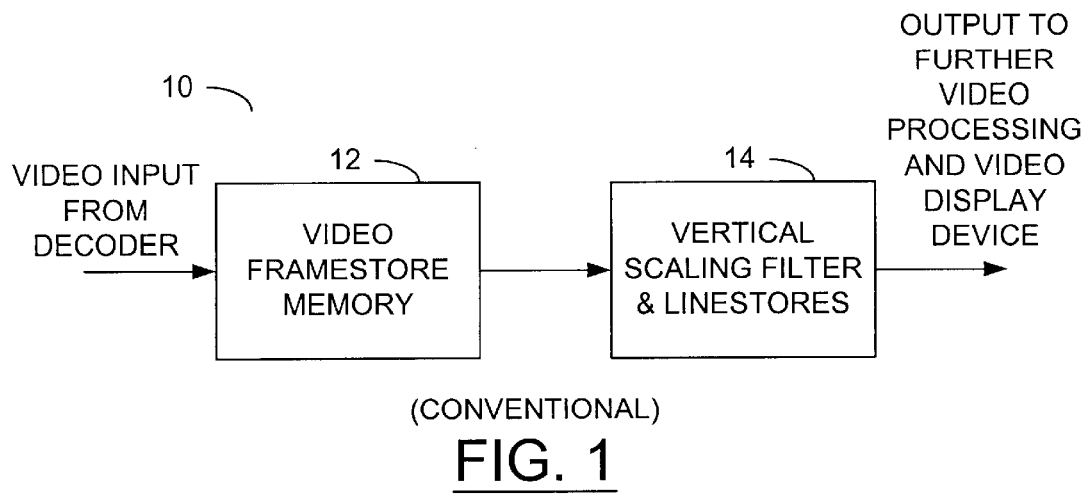
(CONVENTIONAL)
FIG. 1
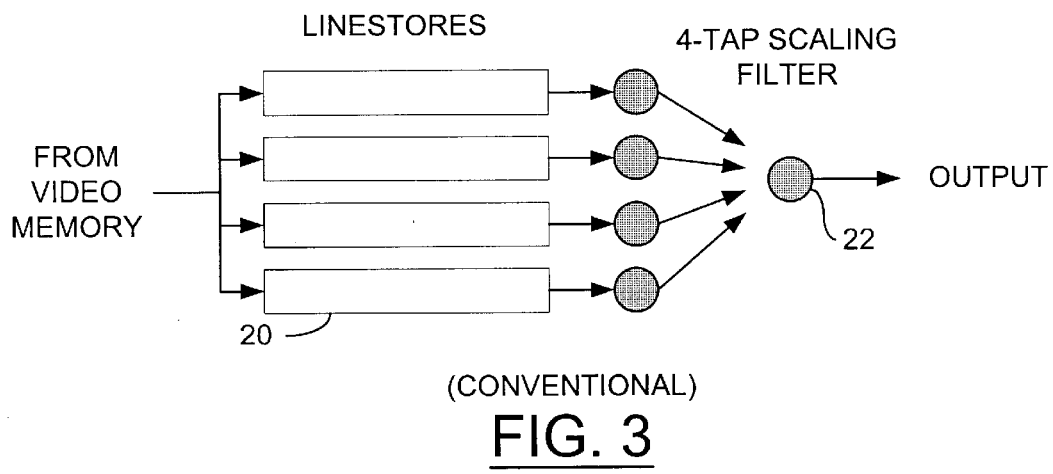
(CONVENTIONAL)
FIG. 3

| INPUT LINES SCALE 1 | INPUT LINES SCALE 0.5 | INPUT LINES SCALE 0.25 | OUTPUT LINE |
|---|---|---|---|
| 1,2,3,4 | 1,2,3,4 | 1,2,3,4 | 1 |
| 2,3,4,5 | 3,4,5,6 | 5,6,7,8 | 2 |
| 3,4,5,6 | 5,6,7,8 | 9,10,11,12 | 3 |

(CONVENTIONAL)

FIG. 4

| INPUT LINES SCALE 0.5 | INPUT LINES SCALE 0.25 | OUTPUT LINE |
|---|---|---|
| 1,1,3,5 | 1,1,3,5 | 1 |
| 1,1,5,7 | 3,5,7,9 | 1 |
| 3,5,7,11 | 7,9,11,13 | 1 |

FIG. 5a

| ACCUMULATOR 304 INPUT SUM[10:8] | INPUT LINES COUNTER 306 INPUT SUM [7:0] | OUTPUT LINE |
|---|---|---|
| 0x1 | 0xAA | 2 |
| 0x1 | 0xFF | 3 |
| 0x2 | 0x54 | 4 |
| 0x1 | 0xA9 | 5 |
| 0x1 | 0xFE | 6 |
| 0x2 | 0x53 | 7 |

FIG. 5b

| PHASE | 0 | 1 | 2 | 3 | 0 | 1 | 2 | 3 |
|---|---|---|---|---|---|---|---|---|
| $C_0$ | -18 | -38 | -53 | -52 | -44 | -34 | -20 | -9 |
| $C_1$ | 250 | 240 | 218 | 180 | 135 | 88 | 44 | 9 |
| $C_2$ | 44 | 88 | 135 | 180 | 218 | 240 | 251 | 247 |
| $C_3$ | -20 | -34 | -44 | -52 | -53 | -38 | -18 | 9 |

FIG. 10

BANDWIDTH MANAGEMENT

FIELD OF THE INVENTION

The present invention relates to scaling video generally and, more particularly, a system and/or method for implementing a vertical filter for scaling a video picture that manages bandwidth.

BACKGROUND OF THE INVENTION

A vertical filter is used in, for example, an MPEG-2 video decoder to scale the video picture and reduce height of the video picture. After each input video frame is written into memory the video frame is scaled to a smaller size using the vertical filter. The filter reads a number of input video display lines from a linestore. As each new output line is calculated the filter needs some new input lines to be loaded into the linestore from the framestore memory. With the output picture at a quarter of the input size this requires four new input lines to be loaded from the framestore memory for each output line calculated. The new input lines require a large amount of memory bandwidth.

SUMMARY OF THE INVENTION

One aspect the of present invention provides a method of vertically scaling a video picture comprising, receiving and storing lines of a video frame of a video picture, (ii) reading lines of the frame into linestores, (iii) applying the lines to a vertical filter and (iv) providing an output video line as a function of the lines. Reading the lines of the frame into linestores comprises reading M lines of each successive $N^{th}$ line of the frame lines into the linestores, the value of M being dependent on a preselectable scaling factor.

In one example, reading M lines into linestores comprises reading a selected number of each successive $2^{nd}$ line of the frame lines into linestores. The method may further comprise (i) following generation of the output video line, reading a further X lines from the framestore into the linestores to provide a further set of M lines in the linestores, (ii) applying the M lines to the vertical filter and (iii) providing a further output video line as a function of the lines, where X may be a variable function of the scaling factor which is preselectable by a user and may be in the range 0.25 to 4.0.

The output video line is ideally a function of the lines in the linestores and of coefficients of the vertical filter. In a further preferred form of the invention applying the lines to a vertical filter and providing an output video line as a function of the lines comprises the steps of (i) applying a first data word of each the M lines of data in the linestores to the vertical filter and generating a first data word of the output line as a function thereof and (ii) repeating step (i) for successive data words in the M lines of data in the linestores to generate successive output line data words as a function thereof to form the output line. Each successive data word of the output line may be a function of the associated data word of lines in the linestores and of coefficients of the vertical filter.

In another aspect of the invention, an apparatus may provide vertically scaling of a video picture. The apparatus generally comprises a framestore, a plurality of linestores, a control circuit, and a vertical filter. The framestore may be configured to receive and store lines of a video frame of a video picture. The plurality of linestores may receive M lines from the frame store. The control circuit may be configure to control the reading of each $N^{th}$ line of the frame lines into the linestores to provide the M lines. The value of M may be dependent on a preselectable scaling factor. The vertical filter may provide an output video line as a function of the M lines in the linestores.

In one example, the control circuit comprises an address generator for generating addresses of data in data lines in the frame store to be read into the linestores, the address generator comprises a controller and an incrementing circuit. The controller may be configured to generate the base address for the frame stored in the frame store and set the line address of each data line to be read into the linestores. The incrementing circuit may be configured to increment through the addresses for the line. The controller increments the line addresses to cause each $N^{th}$ line of the frame lines to be read into the linestores, where the value of N is typically 1 or 2.

The vertical filter is operable (or configured) to (i) receive a first data word of each the M lines of data in the linestores and to generate a first data word of the output line as a function thereof, and (ii) to receive successive data words of the M lines of data in the linestores and generate successive output line data words as a function thereof to form the output line. The filter comprises a multiplier for multiplying each the word of the lines from the linestores by a coefficient of the filter.

The control circuit is configured, following generation of the output video line, to read a further X lines from the framestore into the linestores to provide a further set of M lines in the linestores, and the vertical filter is configured to provide a further output video line as a function of the further set of M lines.

The apparatus advantageously comprises input circuit configured to enable a user to set a scaling factor for the vertical filter, the value X being a variable function of the scaling factor. The scaling factor has a value in the range 0.25 to 4.0.

In one example, the control circuit includes a filter control circuit comprising: a phase accumulator; a summing circuit configured to sum a value representing the scaling factor and an output of the accumulator; a counter configured to store a count value. The summing circuit has a first output for applying a first value to an input of the accumulator and a second output for applying a second value to the counter. The first and second values are functions of the scaling factor value. The control circuit is configured to control the value of M in response to (or in dependence on) the counter count.

The objects, features and advantages of the present invention include providing an improved vertical filter and method of scaling a video picture.

BRIEF DESCRIPTION OF THE DRAWINGS

These and other objects, features and advantages of the present invention will be apparent from the following detailed description and the appended claims and drawings in which:

FIG. 1 is a simplified block diagram of a system for vertical scaling of video frames;

FIG. 3 is a block diagram of linestores and scaling filter of a conventional system for vertical scaling of video frames;

FIG. 4 is a table illustrating the relationship between lines input to the linestores from a framestore and output lines from the filter using various scaling factors for the system of FIG. 3;

FIGS. 5a and 5b are tables illustrating the relationship between lines input to the linestores from a framestore and output lines from the filter using various scaling factors according to a preferred embodiment of the present invention;

FIG. 10 is a table of filter coefficients used in the scaling process.

DETAILED DESCRIPTION OF THE PREFERRED EMBODIMENTS

Figure 2:
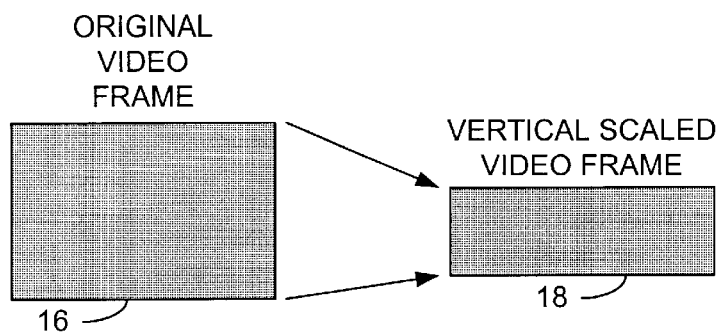
FIG. 2 is a representation of a video frame before and after vertical scaling.

Referring to FIG. 1 a conventional system 10 for vertical scaling of video pictures is shown. The system has a conventional video framestore memory 12 and vertical scaling filter and linestores 14. Referring to FIG. 2, the vertical scaling of an original sized video frame 16 to a vertically scaled frame 18 is shown. The vertical scaling filter and linestores 14 is shown in more detail in FIG. 3 and has an array of linestores 20. Each of the array of linestores 20 is connected to receive pixel line data from video framestore memory 12 and to apply the line data to respective taps of a scaling filter 22. To effect the scaling, the vertical scaling filter and linestores 14 needs to read a number of input lines from the linestores. In the system illustrated in FIG. 3, the filter 22 has four input taps and requires four lines of the input picture to be read into the filter linestores from the video framestore memory 12. As each output line is calculated, the filter 22 requires new input lines to be loaded into the array of linestores 20 from the video framestore memory 12. When the output picture is the same size as the input picture, then the linestores require only one new input line for each new output line. If the output picture is half the size of the input picture, then the linestores require two new input lines for each new output line. If the output picture is a quarter the size of the input picture, then all four linestores need to be loaded for each new output line.

Referring to FIG. 4, a table illustrating the input lines changing for each new output line calculated in response to the scaling factor is shown. The first row in FIG. 4 represents the first four video lines being loaded into the array of linestores 20. The first output line, calculated from the four lines of pixel data in the array of linestores 20, is shown in the fourth column. For the first output line all of the linestores need to be loaded regardless of the scaling. For output lines 2 and 3 the new lines which are loaded are shown in bold. For a scaling factor of 1:1, one new line is loaded for each new output line. The table shows new lines 5 and 6 loaded for the new output lines 2 and 3. For a scaling factor of 2:1, two new lines are loaded for each new output line. New lines 5 and 6 are loaded for output line 2 and new lines 7 and 8 are loaded for output line 3. For a scaling factor of 4:1, four new lines are loaded from the video framestore memory 12 for each new output line. Thus, new lines 5 to 8 are loaded for output line 2 and new lines 9 to 12 are loaded for output line 3. This requires a large amount of memory bandwidth.

Referring to FIG. 5a, a table is show illustrating the relationship between input lines and output lines calculated in response to the scaling factor using the system and/or method of scaling according to the present invention. The table shows that only one line in two is loaded into the linestores. If alternate input lines are missed out then the input picture is already half the height of the original before it is applied to the scaling filter. The vertical filter then only has to scale at a lower scale ratio to get the output picture. This then only requires half the original memory bandwidth to provide the same scaled output picture. As shown in FIG. 5, for a scaling factor of 2:1 each output line 2 and 3 only requires one new line to be read into the array of linestores 20. For a scaling factor of 4:1 only two new lines need to be read into the array of linestores 20 for each output line 2 and 3.

Figure 6:
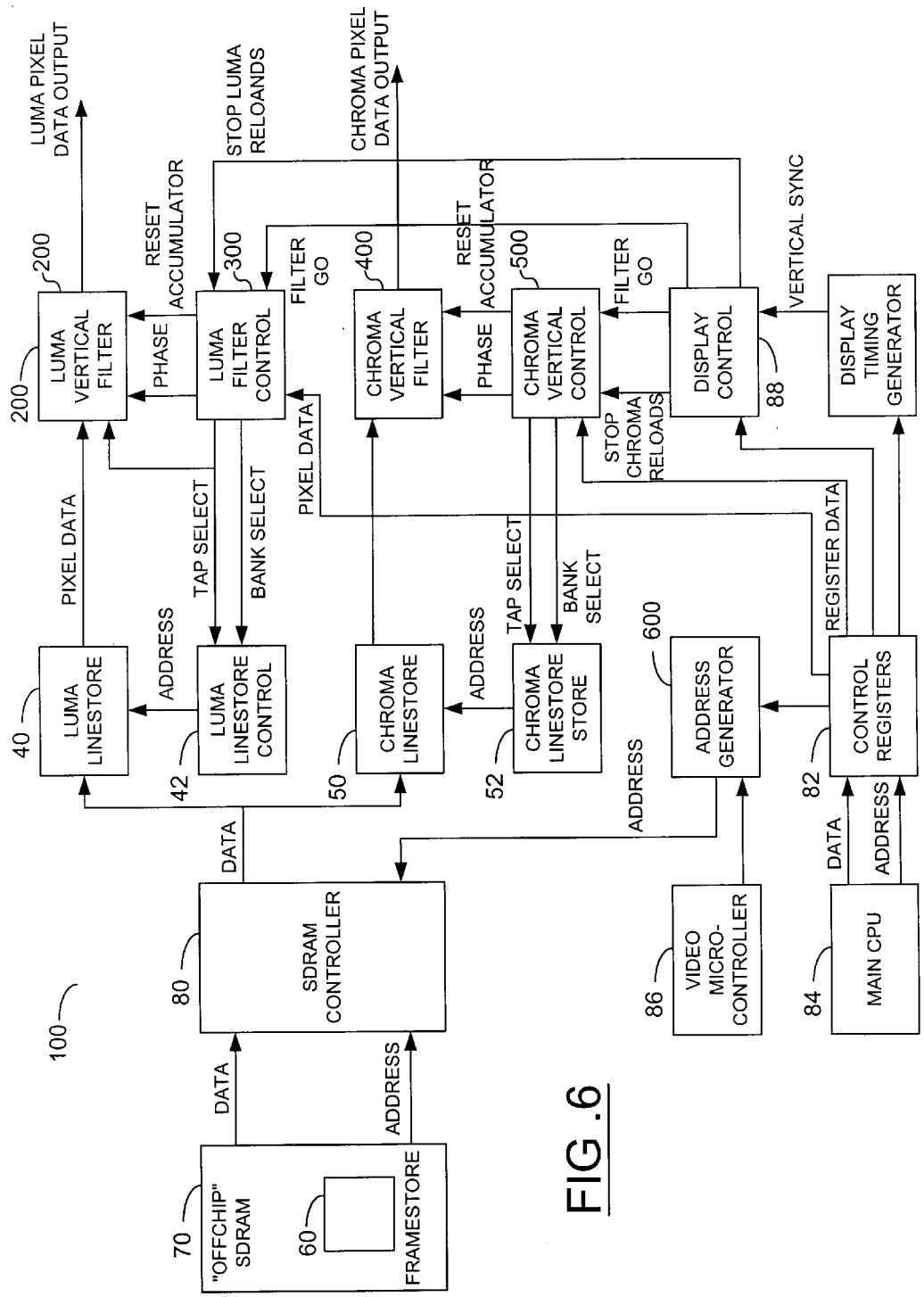
FIG. 6 is a block diagram of a preferred system for vertical scaling of video frames of a digital video picture.

Referring to FIG. 6, a diagram of a vertical filter 100 is shown. Much of the circuitry in the filter is conventional and is not described in detail here. The filter has a luma vertical filter 200 which is controlled by a luma filter control 300, and a chroma vertical filter 400 controlled by a chroma filter control 500. The two filters receive data respectfully from luma and chroma linestores 40, 50 each of which is controlled by a respective linestore control 42, 52. The linestores 40, 50 receive data from framestores 60 which are formed by reserved areas in memory 70, the transfer of data from the framestores 60 to the linestores 40, 50 being by way of an SDRAM controller 80 under the control of an address generator 600. The address generator 600 selects the addresses of the data to be transferred from the framestores 60 to the linestores 40, 50 to ensure that each line of pixel data from framestores 60 is correctly read into linestores 40, 50. The address generator 600 generates the addresses in response to information provided by control registers 82 which are set by a main processor 84, and in response to information from a video microcontroller 86.

Figure 7:
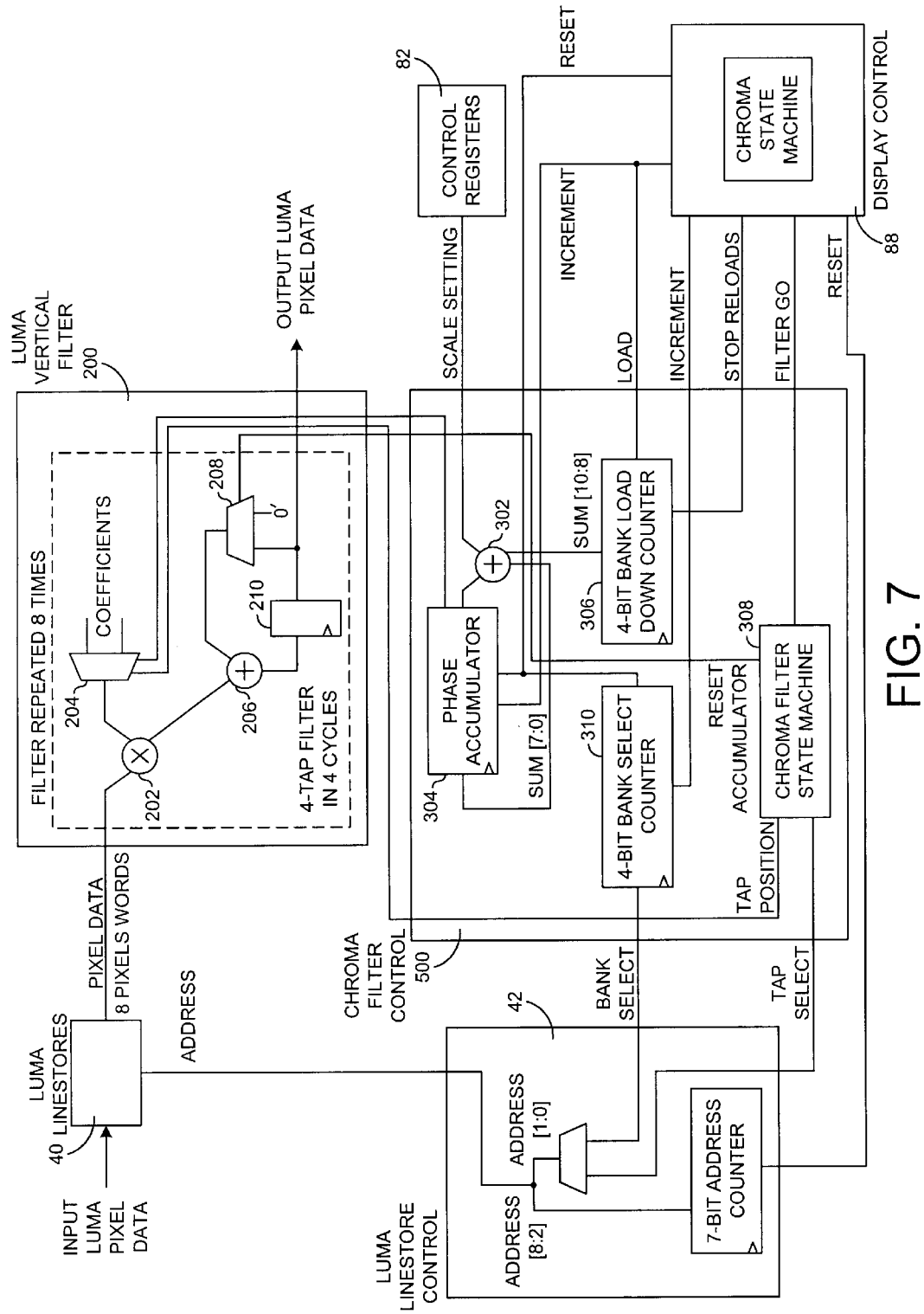
FIG. 7 is a block circuit diagram of the luma vertical filter of the system of FIG. 6.

FIG. 7 shows in more detail the luma linestore 40, the luma vertical filter 200, the luma filter control 300 and the luma linestore control 42. The luma linestore 40 has four linestores each of which can store pixel data for a line of a picture field or frame stored in framestores 60. The video microcontroller 86 controls the decoding of frames into the framestore 60. Before processing of the data in the luma linestores 40 begins, the users sets a scaling factor and linedrop setting, the representative data for which is applied by the main processor 84 to the control registers 82. In one example, the scaling factor may be an 11-bit word which is applied by the control registers to a summing circuit 302 of the luma filter control 300. The summing circuit 302 also receives an input from a phase accumulator 304. At the start of the process the output from the phase accumulator 304 is zero. The eight least significant bits (LSBs) of the output of the summing circuit 302 are applied to an input of the phase accumulator 304. The three most significant bits (MSBs) are applied to a register 306. In one example, the register 306 may be implemented in the form of a counter which counts down to zero as described below. The phase accumulator 304 can be reset by a reset signal from display control 88 which controls the operation of the luma filter control 300.

The counter 306 is first preloaded by the number of lines to be loaded into the linestores 40. Once counter 306 has been pre-loaded the display control 88 controls the luma linestores control 42 to direct input line data to the relevant linestores in the luma linestores 40. Each time a new line is loaded into the luma linestores 40 the counter 306 decrements. Once the counter 306 reaches 0, the display control 88 stops loading the linestores 40. The display control 88 then passes a signal (e.g., Filter Go) to the luma filter state-machine 308 to begin the filtering process.

Once the filtering process is complete for the first output line, the counter 306 is again preloaded with a count value which sets the number of new lines to be loaded into linestores 40. However, the new count value is a function of the scale factor which has been set by the user and the previous value content of the phase accumulator 304. This enables a user to set a variable scaling factor (e.g., between 0.5 and 4.0). The scaling factors above 1 are effectively a zoom function. FIG. 5b is a table similar to that of FIG. 5a, but with values in hexadecimal, showing the loading of lines from framestore 60 for a scaling factor of 75%. In this example, two lines are loaded into the luma linestores 40 for every third output line calculated. The table of FIG. 5b represents the values of the summing circuit 302 output. The vertical scale is 0.75 giving a scaling factor of 0×155 in hexadecimal. In each case the scaling factor is added to the previous phase accumulator output. If the linedrop function is enabled this gives a scale of 0.375. In the first column it can be seen that two lines are loaded for each third output line.

The luma vertical filter 200 comprises a multiplier 202 which receives pixel data from the linestores 40. The multiplier 202 also receives a signal from a multiplexer 204 which is controlled both by the luma filter state-machine 308 and the phase accumulator 304. The output of the multiplier 202 is applied to summing circuit 206 which also receives a signal from multiplexer 208. The output of summing circuit 206 is applied to register 210 whose output forms the output luma pixel data and is also applied to one input of multiplexer 208. A second input of multiplexer 208 is set at 0.

The multiplexer 204 has a number of inputs to receive respective coefficients (e.g., $C_0$ to $C_3$) of the filter. The coefficients $C_0$ to $C_3$ are filter coefficients taken from the filter response characteristics and are dependent on the state of the phase accumulator 304 and the luma filter state-machine 308. The value of the relevant coefficients applied to multiplier 202 are dependent on the bits in the phase accumulator 304, and therefore on the scaling factor set by the user. Examples of the coefficients are set out in the table of FIG. 10. As can be seen, there are 8 possible values for each coefficient depending on the state of phase accumulator 304.

In operation, the first word from the first line of pixel data in the luma linestores 40 is applied to multiplier 202. This value is multiplied by the coefficient $C_0$ for the relevant phase determined by the content of phase accumulator 304. Luma filter state-machine 308 sets the coefficient $C_0$ to $C_3$ according to the data line in the luma linestores 40 which is being processed. The output of the multiplier 202 is applied to the summing circuit 206 whose other input receives the output of the multiplexer 208. In the first process the output of the multiplexer 208 is 0 and thus the output of the multiplier 202 is loaded into the register 210.

The first data word of the second pixel data line is then applied to multiplier 202 where it is multiplied by the selected coefficient $C_1$, in accordance with the phase of phase accumulator 304. The output of multiplier 202 is applied to summing circuit 206 and added to the content of the register 210 which is applied to the second input of the summing circuit 206 via the multiplexer 208. Thus, the output of the multiplier 202 is added to the content of the register 210 formed by the preceding calculation. The output of the summing circuit 206 is then applied to the register 210 which is updated to show the accumulation of its existing data and the newly applied data.

The first word of the third pixel data line is processed in a similar manner, being multiplied in multiplier 202 by the coefficient $C_2$, and added by the summing circuit 206 to the previous contents of the register 210 to the update register 210. The first word of the fourth pixel data line in the luma linestores 40 is processed in a similar manner. The result is a single output luma pixel data word which is a composite or is calculated from the four first words of the four pixel data lines in the linestores 40.

The process is repeated for successive words in the first four pixel data lines to produce a single complete output luma pixel data line. The addresses of the linestores to which data from the framestores 60 is written are controlled by the counter 310 and the luma filter state-machine 308. The selection of the addresses of the words which are to be read from the luma linestores 40 by the luma vertical filter are controlled by luma filter state-machine 308. The counter 310 is incremented and is also reset by the display control 88, as is the phase accumulator 304, at the start of each process.

As will be appreciated, a single output luma pixel data line is generated by the luma vertical filter 200 for the first four lines of input luma pixel data stored in the linestores 40. If the scaling factor is 1 then the second output luma pixel data line is generated by processing lines 2 to 5 from the luma linestores 40 in exactly the same way as lines 1 to 4 were processed. If the scaling factor is 0.5 then the second output luma pixel data line is created from lines 3, 4, 5 and 6 from the luma linestores 40. If the scaling factor is 0.25 then the second output luma pixel data line is created from lines 5 to 9 from the luma linestores 40.

Figure 8:
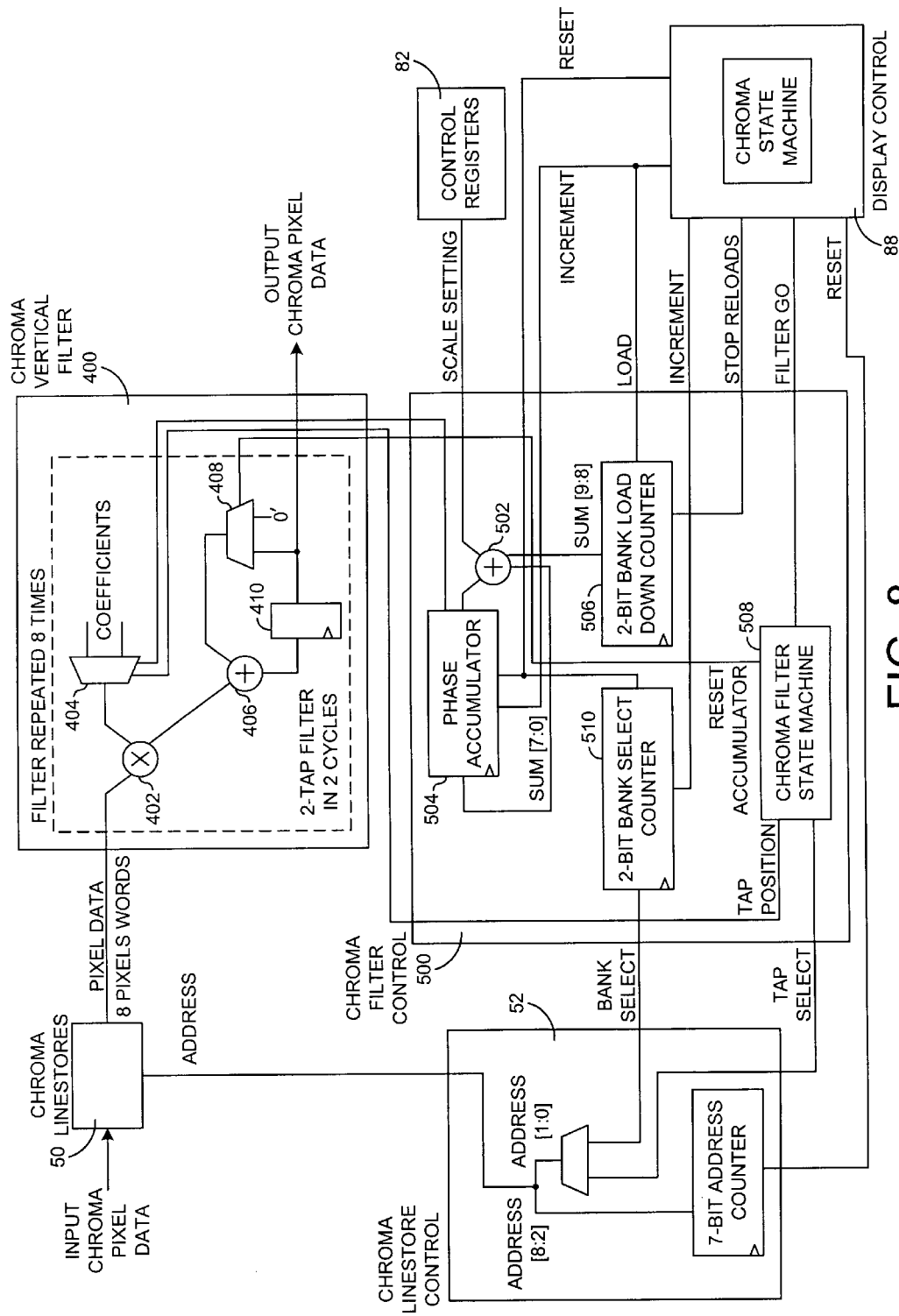
FIG. 8 is a block circuit diagram of chroma vertical filter of the system of FIG. 6.
Figure 9:
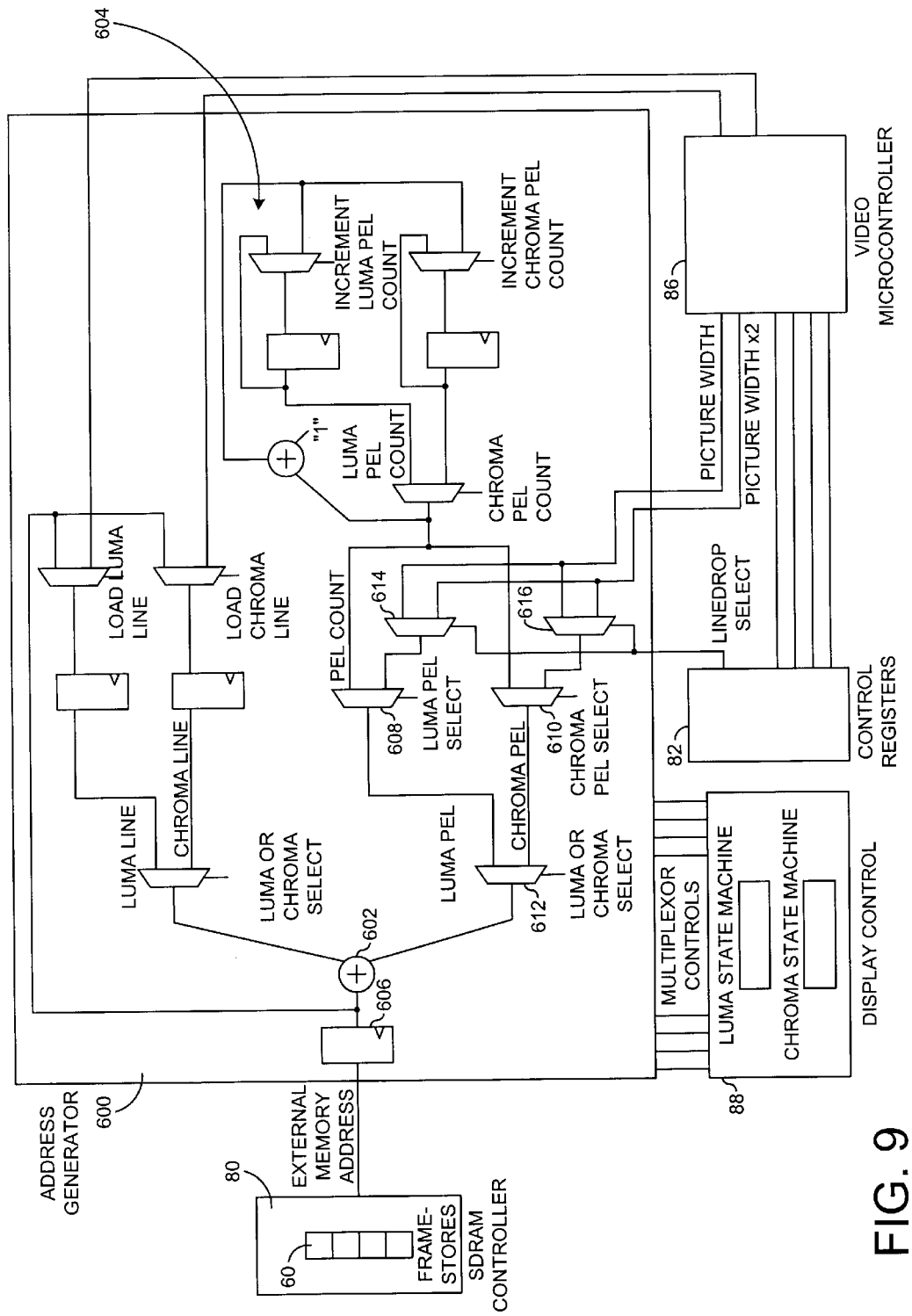
FIG. 9 is a circuit diagram of the address generator of the system of FIG. 6.

FIG. 8 shows a block circuit diagram of the chroma vertical filter of the system of FIG. 6. FIG. 8 is similar to the luma filter of FIG. 7, but has two filter taps and two linestores and operates in a similar manner to luma filter of FIG. 7. The address generator 600 is shown in more detail in FIG. 9. In conventional address generators, the video microcontroller 86 sets the chroma and luma memory base address for each framestore 60. The display controller 88 determines whether chroma or luma data is being processed by way of multiplexers. In an example where luma data is being processed, the luma memory base address is applied to summing circuit 602 which adds an increment from incrementing circuit 604. Incrementing circuit 604 is controlled by the video microcontroller 86 and increments from zero to the line width to generate successive word addresses at the output of summing circuit 602, these being applied to register 606. The address generator 600 thus generates successive addresses for the data words in a picture line for these to be read from framestores 60 to the relevant linestores in the luma linestores 40.

The video microcontroller 86 generates a picture width signal when the incrementing circuit 604 resets to zero in order to start the new address generated by the summing circuit 602 at the next successive line of the framestore 60. The picture width signal is applied to luma and chroma pixel select multiplexers 608, 610 whose outputs are applied to a multiplexer 612. The multiplexer 612 in turn applies the selected chroma or luma increment to summing circuit 602 in response to whether the luma or chroma data signals are being processed. Thus, in the conventional operation, at the end of each line the video microcontroller 86 adds a picture width signal to the incremental signal in order to cause the address generator 600 to generate addresses along successive picture lines.

In one example, the new luma and chroma multiplexers 614, 616 are added to the address generator 600. Each of the multiplexers 614 and 616 is connected to receive both the picture width and a picture width×2 signal from the video microcontroller 86. The output of multiplexers 614 and 616 are connected to the multiplexers 608 and 610, respectively.

Each of the multiplexers 614 and 616 is also connected to receive a linedrop select signal from control register 82. The linedrop select signal can be a single bit signal indicating that no lines are to be dropped. The multiplexers 614 and 616 apply the picture width signal to the multiplexers 608 and 610. Where the linedrop select signal indicates that alternate lines are to be dropped, then the multiplexers 614 and 616 apply the picture width×2 signal to the multiplexers 608 and 610. As usual, at the end of each line of address scans by the address generator 600, the start address applied to summing circuit 602 is incremented by picture width×2.

While the invention has been particularly shown and described with reference to the preferred embodiments thereof, it will be understood by those skilled in the art that various changes in form and details may be made without departing from the spirit and scope of the invention. For example, the present invention has been described the Video Picture as a Frame. However, a Frame may also exists as 2 Fields which are scaled separately. Although only Frame-based scaling is described, the present invention may scale Frame-based or Field-based Video Pictures using the same technique.

What is claimed is:

1. A method of vertically scaling a video picture, comprising the steps of:
   (A) receiving and storing lines of a video frame of said video picture;
   (B) reading M lines from said frame into linestores;
   (C) applying said M lines to a vertical filter; and
   (D) providing an output video line as a function of said M lines, wherein reading said M lines from said video frame into said linestores comprises reading M lines of each successive $N^{th}$ line of said frame into said linestores, a value of M is dependent on a preselectable scaling factor, applying said M lines to said vertical filter comprises steps of (i) applying a first data word of each said M lines of data in said linestores to said vertical filter and generating a first data word of said output video line as a function thereof and providing said output video line as said function of said M lines comprises a step of repeating step (i) for successive data words in said M lines of data in said linestores to generate successive output line data words as a function thereof to form said output video line.

2. The method of claim 1, further comprising the steps of:
   following generation of said output video line, reading a further X lines from said frame store into said linestores to provide a further set of M lines in said linestores;
   applying said further set of M lines to said vertical filter; and
   providing a further output video line as a function of said further set of said M lines.

3. The method of claim 2, wherein a value of X is a variable function of said preselectable scaling factor.

4. The method of claim 3, wherein said preselectable scaling factor is preselectable by a user.

5. The method of claim 4, wherein said preselectable scaling factor is a value in a range of 0.25 to 4.0.

6. The method of claim 4, wherein said preselectable scaling factor is a value in a range of 0.25 to 1.0.

7. The method of claim 1, wherein each said successive output line data word of said output video line is a function of an associated data word of said M lines in said linestores and of coefficients of said vertical filter.

8. An apparatus for vertically scaling a video picture, comprising:
   a frame store configured to receive and store lines of a video frame of said video picture;
   a plurality of linestores configured to receive M lines from said frame store;
   a control circuit configured to control a reading of each $N^{th}$ line of said lines into said linestores to provide said M lines, a value of M being dependent on a preselectable scaling factor; and
   a vertical filter for providing an output video line as a function of said M lines in said linestores, wherein said control circuit comprises an address generator for generating addresses of data in said lines in said frame store to be read into said linestores, said address generator comprising a controller for generating a base address for said video frame stored in said frame store and for setting a line address of each said line to be read into said linestores, and an incrementing circuit for incrementing through said addresses for each said line.

9. The apparatus of claim 8, wherein said controller increments said line addresses to cause each $N^{th}$ line of said lines to be read into said linestores.

10. The apparatus of claim 9, wherein a value of N is 2.

11. The apparatus of claim 8, wherein said vertical filter comprises a multiplier configured to multiply each said data word of said M lines from said linestores by a coefficient of said vertical filter.

12. An apparatus for vertically scaling a video picture, comprising:
   a frame store configured to receive and store lines of a video frame of said video picture;
   a plurality of linestores configured to receive M lines from said frame store;
   a control circuit configured to control a reading of each $N^{th}$ line of said lines into said linestores to provide said M lines, a value of M being dependent on a preselectable scaling factor; and
   a vertical filter for providing an output video line as a function of said M lines in said linestores, wherein said vertical filter is configured to (i) receive a first data word of each said M lines of data in said linestores and to generate a first data word of said output line as a function thereof, (ii) receive successive data words of said M lines of data in said linestores and (iii) generate successive output line data words as a function thereof to form said output video line.

13. The apparatus of claim 12, wherein:
   said control circuit is configured, following generation of said output video line, to read a further X lines from said frame store into said linestores to provide a further set of M lines in said linestores, and
   said vertical filter is configured to provide a further output video line as a function of said further set of M lines.

14. The apparatus of claim 13, further comprising an input circuit configured to enable a user to set a scaling factor for said vertical filter, wherein a value of X is a variable function of said scaling factor.

15. The apparatus of claim 14, wherein said scaling factor is in a range of 0.25 to 4.0.

16. The apparatus of claim 14, wherein said scaling factor is in a range of 0.25 to 1.0.

17. An apparatus for vertically scaling a video picture, comprising:

a frame store configured to receive and store lines of a video frame of said video picture;

a plurality of linestores configured to receive M lines from said frame store;

a control circuit configured to control a reading of each $N^{th}$ line of said lines into said linestores to provide said M lines, a value of M being dependent on a preselectable scaling factor; and a vertical filter for providing an output video line as a function of said M lines in said linestores, wherein said control circuit includes a filter control circuit comprising:

a phase accumulator;

a summing circuit for summing a value representing said preselectable scaling factor and an output of said phase accumulator; and a counter for storing a count value, wherein (i) said summing circuit has a first output for applying a first value to an input of said phase accumulator and a second output for applying a second value to said counter, (ii) said first and said second values are functions of said preselectable scaling factor and (iii) said control circuit is configured to control said value of M in response to said count value.

* * * * *